(12) United States Patent
Kubo et al.

(10) Patent No.: US 11,769,638 B2
(45) Date of Patent: Sep. 26, 2023

(54) POWER STORAGE DEVICE COMPRISING AN ELECTRICITY STORAGE ELEMENT, A CASE WITH AN OPENING, AND A SEALING MEMBER SEALING THE OPENING

(71) Applicant: Panasonic Intellectual Property Management Co., Ltd., Osaka (JP)

(72) Inventors: Daisuke Kubo, Osaka (JP); Doyu Hachisu, Yamaguchi (JP); Nobuyuki Matsuzawa, Osaka (JP); Miyoko Masuda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 394 days.

(21) Appl. No.: 16/808,321

(22) Filed: Mar. 3, 2020

(65) Prior Publication Data

US 2020/0203082 A1    Jun. 25, 2020

Related U.S. Application Data

(63) Continuation of application No. PCT/JP2018/036208, filed on Sep. 28, 2018.

(30) Foreign Application Priority Data

Sep. 29, 2017  (JP) .................................. 2017-191960

(51) Int. Cl.
*H01G 9/10*     (2006.01)
*H01G 9/008*    (2006.01)
(Continued)

(52) U.S. Cl.
CPC .................. *H01G 9/10* (2013.01); *C08K 3/34* (2013.01); *C08K 5/13* (2013.01); *H01G 9/008* (2013.01);
(Continued)

(58) Field of Classification Search
CPC ........ H01G 9/10; H01G 9/0032; H01G 9/008; H01G 9/035; H01G 9/151; C08K 3/34;
(Continued)

(56) References Cited

U.S. PATENT DOCUMENTS

| 6,128,179 A | 10/2000 | Morokuma |
| 2002/0139553 A1 | 10/2002 | Minato et al. |

(Continued)

FOREIGN PATENT DOCUMENTS

| CN | 1366318 A | 8/2002 |
| CN | 101213251 A | 7/2008 |

(Continued)

OTHER PUBLICATIONS

International Search Report of PCT application No. PCT/JP2018/036208 dated Dec. 18, 2018.

(Continued)

*Primary Examiner* — David M Sinclair
*Assistant Examiner* — Daniel M Dubuisson
(74) *Attorney, Agent, or Firm* — McDermott Will & Emery LLP

(57) ABSTRACT

A power storage device includes an electricity storage element, a case, and a sealing member which includes an elastic member. The elastic member contains an elastic polymer and a hindered phenol compound. The hindered phenol compound having a phenol skeleton includes a first hindered group and a second hindered group. The first hindered group is bonded to a first substitution site of the phenol skeleton, and the second hindered group is bonded to a second substitution site of the phenol skeleton. Each of the first substitution site and second substitution site is adjacent to a substitution site of the phenol skeleton to which a phenolic hydroxy group is bonded. One of one or more tertiary carbon atoms in the first hindered group and one of (Continued)

one or more tertiary carbon atoms in the second hindered group are bonded to the first substitution site and the second substitution site, respectively.

15 Claims, 1 Drawing Sheet

(51) Int. Cl.
*C08K 3/34* (2006.01)
*C08K 5/13* (2006.01)
*H01G 9/00* (2006.01)
*H01M 10/0525* (2010.01)
*H01M 10/34* (2006.01)
*H01M 50/186* (2021.01)
*H01M 50/179* (2021.01)
*H01M 50/193* (2021.01)
*H01G 9/035* (2006.01)

(52) U.S. Cl.
CPC ...... *H01G 9/0032* (2013.01); *H01M 10/0525* (2013.01); *H01M 10/345* (2013.01); *H01M 50/179* (2021.01); *H01M 50/186* (2021.01); *H01M 50/193* (2021.01); *H01G 9/035* (2013.01)

(58) Field of Classification Search
CPC .......... C08K 5/13; C08K 3/04; C08K 5/0025; H01M 10/0525; H01M 10/345; H01M 50/183; H01M 50/172; Y02E 60/10
See application file for complete search history.

(56) References Cited

U.S. PATENT DOCUMENTS

| | | | | |
|---|---|---|---|---|
| 2004/0180994 | A1* | 9/2004 | Pearson | C08L 23/10 524/413 |
| 2007/0020500 | A1* | 1/2007 | Kanaoka | H01M 8/103 429/494 |
| 2007/0115612 | A1* | 5/2007 | Minato | H01G 9/10 361/517 |
| 2007/0165362 | A1* | 7/2007 | Minato | H01G 9/145 361/518 |
| 2008/0293852 | A1 | 11/2008 | Gronowski et al. | |
| 2009/0118404 | A1 | 5/2009 | Hakuta et al. | |
| 2009/0123824 | A1 | 5/2009 | Fujiwara et al. | |
| 2009/0135547 | A1 | 5/2009 | Nanba et al. | |
| 2010/0232088 | A1 | 9/2010 | Fujita et al. | |
| 2013/0231432 | A1* | 9/2013 | Pharr | C08L 23/22 524/505 |
| 2016/0177062 | A1 | 6/2016 | Sato et al. | |
| 2016/0185936 | A1* | 6/2016 | Ikeshiro | C08K 3/22 524/274 |

FOREIGN PATENT DOCUMENTS

| | | | |
|---|---|---|---|
| CN | 105392842 A | | 3/2016 |
| CN | 106010207 A | * | 10/2016 ......... C08G 18/4018 |
| EP | 0952594 A2 | * | 10/1999 |
| JP | 11-274011 | | 10/1999 |
| JP | 2008-097965 | | 4/2008 |
| JP | 2008-523174 | | 7/2008 |
| JP | 2008-251980 | | 10/2008 |
| JP | 2013216782 A | * | 10/2013 |
| JP | 2017-097978 | | 6/2017 |
| JP | 2017103085 A | * | 6/2017 |
| KR | 20100123000 A | * | 11/2010 |
| WO | 2007/125896 | | 11/2007 |
| WO | 2008/136175 | | 11/2008 |

OTHER PUBLICATIONS

English Translation of Chinese Office Action dated Nov. 29, 2021 for the related Chinese Patent Application No. 201880061655.6.
The Extended European Search Report dated Oct. 16, 2020 for the related European Patent Application No. 18860974.7.
English Translation of Chinese Office Action dated Apr. 19, 2021 for the related Chinese Patent Application No. 201880061655.6.

\* cited by examiner

POWER STORAGE DEVICE COMPRISING AN ELECTRICITY STORAGE ELEMENT, A CASE WITH AN OPENING, AND A SEALING MEMBER SEALING THE OPENING

RELATED APPLICATIONS

This application is a continuation of the PCT International Application No. PCT/JP2018/036208 filed on Sep. 28, 2018, which claims the benefit of foreign priority of Japanese patent application No. 2017-191960 filed on Sep. 29, 2017, the contents all of which are incorporated herein by reference.

TECHNICAL FIELD

The present invention relates to a power storage device that includes a sealing member including an elastic member.

BACKGROUND

An electrolytic capacitor, which is one of power storage devices, includes a capacitor element, a case housing the capacitor element, and a sealing member sealing an opening of the case. The sealing member includes an elastic member fit in the opening of the case. The elastic member includes an elastic material such as rubber or a rubber-state polymer. In some cases, additive agents such as a filler, a vulcanizing agent, a reinforcing agent, and an antioxidant are added to the elastic member (see, Unexamined Japanese Patent Publication No. 1999-274011).

SUMMARY

One aspect of the present invention relates to a power storage device including an electricity storage element, a case having an opening and housing the electricity storage element, and a sealing member sealing the opening. The sealing member includes an elastic member fit in the opening. The elastic member contains an elastic polymer and a hindered phenol compound. The hindered phenol compound having a phenol skeleton includes a first hindered group and a second hindered group. The first hindered group is bonded to a first substitution site of the phenol skeleton, and the second hindered group being bonded to a second substitution site of the phenol skeleton. Each of the first substitution site and second substitution site is adjacent to a substitution site of the phenol skeleton to which a phenolic hydroxy group is bonded. The first hindered group and the second hindered group each include one or more tertiary carbon atoms. One of the one or more tertiary carbon atoms in the first hindered group is bonded to the first substitution site, and one of the one or more tertiary carbon atoms in the second hindered group is bonded to the second substitution site.

The thermal degradation of the elastic member in the power storage device can be suppressed.

DESCRIPTION OF EMBODIMENT

Figure 1:
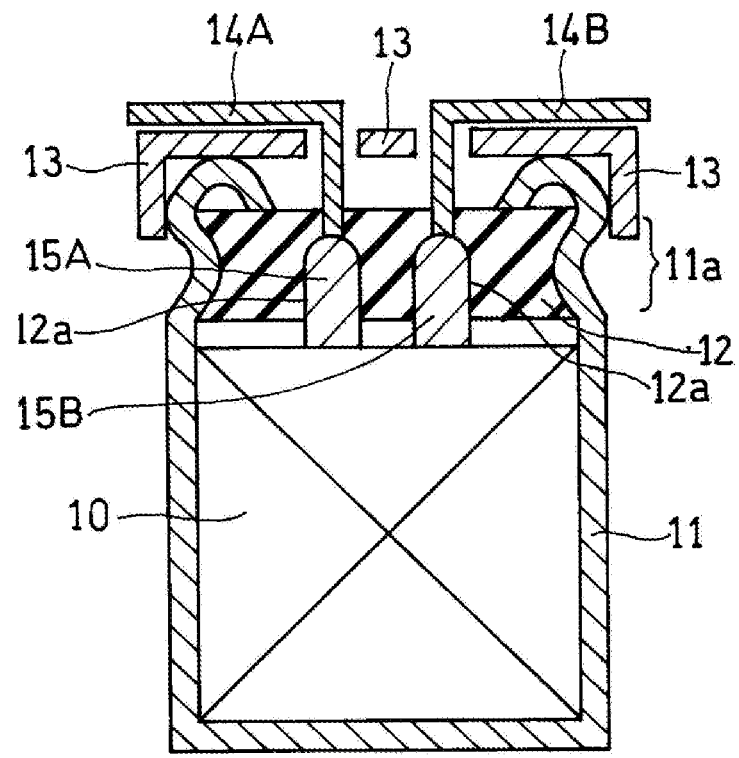
FIG. 1 is a schematic cross-sectional view illustrating an electrolytic capacitor according to one exemplary embodiment of the present invention.

When the power storage device is used under a high temperature environment, the elastic member is thermally degraded significantly. Conventional elastic members have difficulty sufficiently suppressing the thermal degradation.

An electrolytic capacitor, which is one of power storage devices, according to one exemplary embodiment of the present invention includes a capacitor element, which is one of electricity storage elements, a case having an opening and housing the capacitor element, and a sealing member sealing the opening. The sealing member includes an elastic member fit in the opening. The elastic member contains an elastic polymer and a hindered phenol compound. The hindered phenol compound having a phenol skeleton includes a first hindered group and a second hindered group. The first hindered group is bonded to a first substitution site of the phenol skeleton, and the second hindered group is bonded to a second substitution site of the phenol skeleton. Each of the first substitution site and second substitution site is adjacent to a substitution site of the phenol skeleton to which a phenolic hydroxy group is bonded. The first hindered group and the second hindered group each have one or more tertiary carbon atoms. One of the one or more tertiary carbon atoms in the first hindered group is bonded to the first substitution site, and one of the one or more tertiary carbon atoms in the second hindered group is bonded to the second substitution site.

The electrolytic capacitor is supposed to be used under a high temperature environment such as in an automobile engine room. The opening of the case housing the capacitor element is sealed with the elastic member fit in the opening. Since the elastic member is made of an organic polymer such as rubber, which does not have sufficient heat resistance, the elastic member is oxidized and degraded under a high temperature environment. Specifically, under a high temperature environment, since heat acts on the elastic member, radicals are generated from the organic polymer constituting the elastic member. And then oxygen is added to the radicals to form an adduct which further converts the organic polymer into radicals. While this reaction is repeated, a polymer chain of the organic polymer becomes shorter. Since the organic polymer having a shorter polymer chain evaporates due to the action of heat, the elastic member becomes brittle. When an antioxidant is added to the elastic member, the antioxidant supplies proton radicals which trap the organic polymer radicals, whereby the oxidation degradation can be suppressed. Under a high temperature environment, however, since the antioxidant volatilizes, a radical trapping effect by the antioxidant could not be sufficiently obtained and thus it is difficult to suppress the thermal degradation of the elastic member.

Further, in the electrolytic capacitor, when the capacitor element is housed and sealed in the case, large stress is applied to the elastic member because of fitting the elastic member in the opening of the case. Thermal degradation of the elastic member under a condition of applying the stress tends to cause cracks of the elastic member to generate.

According to the exemplary embodiment of the present invention, use of a specific hindered phenol compound in the elastic member suppresses the oxidation degradation of the elastic polymer constituting the elastic member even under a high temperature environment. Accordingly, the thermal degradation of the elastic member can be suppressed. The suppression of the thermal degradation enables to suppress the generation of cracks in the elastic member, even under the condition of applying stress to the elastic member for the sealing.

Hereinafter, the present invention is more specifically described with reference to the exemplary embodiment. The exemplary embodiment below, however, is not to limit the present invention.

Figure 2:
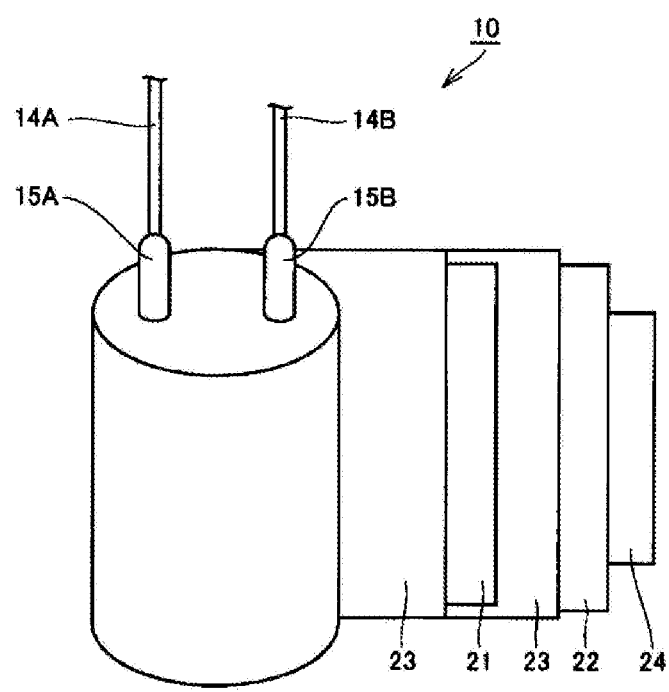
FIG. 2 is a schematic view for illustrating a configuration of a capacitor element according to the exemplary embodiment.

FIG. 1 is a schematic cross-sectional view illustrating an electrolytic capacitor according to the present exemplary embodiment, and FIG. 2 is a schematic view in which a capacitor element of the same electrolytic capacitor is partially developed.

The electrolytic capacitor includes, for example, capacitor element 10, case 11 housing capacitor element 10 and having a cylindrical shape, a sealing member that seals an opening of case 11 and is constituted by elastic member 12, seat plate 13 facing elastic member 12. The electrolytic capacitor further includes lead wires 14A, 14B that are drawn out via through-holes 12a of elastic member 12 and penetrate through seat plate 13, and lead tabs 15A, 15B connecting the lead wires to electrodes of capacitor element 10. A part of case 11 near an opening end is drawn inward, and the opening end is curled to be swaged onto elastic member 12. Further, at a part of case 11 facing a side wall of elastic member 12, there is formed diameter-reduced area 11a where a diameter of case 11 is reduced by drawing (specifically, lateral drawing).

Capacitor element 10 is produced from a wound body illustrated in FIG. 2. The wound body includes anode part 21 connected to lead tab 15A, cathode part 22 connected to lead tab 15B, and separator 23. The wound body illustrated in FIG. 2 is a half-finished product having no electrolyte.

Anode part 21 and cathode part 22 are wound with separator 23 disposed between anode part 21 and cathode part 22. An outermost periphery of the wound body is fixed with fastening tape 24. FIG. 2 illustrates the wound body that is in a state before the outermost periphery of the wound body is fixed and that is partially developed.

Anode part 21 includes a metal foil whose surface is roughened to have projections and recesses, and an oxide film is formed on the metal foil having the projections and recesses. In capacitor element 10, a solid electrolyte is attached to at least a part of a surface of the oxide film. The solid electrolyte may also cover at least a part of a surface of cathode part 22 and/or a part of a surface of separator 23. The electrolytic capacitor is produced in the following manner: capacitor element 10 in which the solid electrolyte has been formed is housed in case 11, and an opening of case 11 is sealed with the sealing member. When an electrolytic solution is used, the electrolytic solution is housed in case 11 together with capacitor element 10.

(Sealing Member)

The sealing member includes elastic member 12 and seals the opening of the case housing capacitor element 10 by fitting elastic member 12 in the opening. Elastic member 12 contains an elastic polymer and a hindered phenol compound.

As the elastic polymer, an insulating material is used. Examples of the elastic polymer include butyl rubber, isoprene rubber, silicone rubber, fluororubber, ethylene-propylene rubber, and chlorosulfonated polyethylene rubber (such as Hypalon™ rubber). One of the elastic polymers may be used alone, or two or more of the elastic polymers may be used in combination.

The hindered phenol compound has a first hindered group and a second hindered group which are respectively bonded to two substitution sites (a first substitution site and a second substitution site) of a phenol skeleton of the hindered phenol compound. Each of the two substitution sites is adjacent to a substitution site of the phenol skeleton to which a phenolic hydroxy group is bonded. These hindered groups each have one or more tertiary carbon atoms, and one of the one or more tertiary carbon atoms of each of these hindered groups is bonded to the corresponding substitution site. Thus, in the hindered phenol compound, the tertiary carbon atom becomes a quaternary carbon atom. Specifically, one of the tertiary carbon atoms in the first hindered group is directly bonded to the first substitution site, and one of the tertiary carbon atoms in the second hindered group is directly bonded to the second substitution site. The hindered phenol compound having such a structure has heat resistance higher than that of a hindered phenol compound having a structure in which a hydrogen atom or a primary or a secondary carbon atom of a substituent is bonded to the first substitution site and the second substitution site. Thus, decomposition of the hindered phenol compound is suppressed even at high temperatures (for example, 155° C.) so that a mass change hardly occurs. Hence, since the hindered phenol compound remains in the elastic member even under a high temperature environment and exerts a radical trapping function, the thermal degradation of the elastic polymer can be suppressed. Accordingly, the generation of cracks in elastic member 12 can be suppressed even when elastic member 12 is exposed to a high temperature environment under the condition of applying stress to elastic member 12 by being pressed from the opening end of the case or by drawing or the like of the case.

Each of the first hindered group and the second hindered group is a substituent having large steric hindrance, which has one or more tertiary carbon atoms. And the each of the first hindered group and the second hindered group may have two or more tertiary carbon atoms. Examples of the hindered groups include a t-butyl group, a 1,1-dimethylpropyl group, and a mesityl group. From a viewpoint of easy availability of the hindered phenol compound and achievement of a high effect of suppressing the thermal degradation, it is preferable that both of the first hindered group and the second hindered group are t-butyl groups.

The hindered phenol compound contained in elastic member 12 can be identified by, for example, subjecting elastic member 12 to an extraction treatment using a Soxhlet extractor, under application of heat (for example, at 80° C.), with a solvent (such as acetone) to give an extract, and by performing gas chromatography-mass spectrometry (GC-MS) on the extract. A compound having a relatively high molecular weight may be identified by liquid chromatography-mass spectrometry (LC-MS) instead of GC-MS.

The hindered phenol compound has a molecular weight ranging preferably from 300 to 3000, inclusive, further preferably from 400 to 2000, inclusive or from 450 to 1500, inclusive. The hindered phenol compound having a molecular weight in the above range is uniformly dispersed easily and, in addition, changes only a little in mass at high temperatures (for example, at 155° C.). Since the mass change of the hindered phenol compound at high temperatures is small, even when elastic member 12 is exposed to a high temperature environment, the hindered phenol compound does not volatilize and thus exerts an anti-oxidization effect. Hence, the effect of suppressing the thermal degradation of elastic member 12 can be further improved.

The molecular weight is measured by GC-MS or LC-MS. A compound having a relatively high molecular weight only has to have an average molecular weight (weight-average molecular weight) within the above molecular weight range.

When the hindered phenol compound easily generates proton radicals, the effect of trapping the radicals generated from the elastic polymer is improved. The more stable are phenol radicals generated due to the proton radicals being pulled out from the hindered phenol compound, the more easily the proton radicals are generated. In this case, the effect of suppressing the thermal degradation of the elastic polymer is improved. From this viewpoint, a reaction heat of phenol radical formation for the hindered phenol compound is preferably less than or equal to 82 kcal/mol (≈343 kJ/mol), further preferably less than or equal to 81 kcal/mol (≈339 kJ/mol) or less than or equal to 80 kcal/mol (≈335 kJ/mol).

The reaction heat of phenol radical formation ($H_r$) for the hindered phenol compound is calculated by a following equation.

$$H_r \text{ (kcal/mol)} = E_r - (E_0 + E_p)$$

(In the equation, $E_r$ is energy of the hindered phenol compound in a radical state, $E_0$ is energy of the hindered phenol compound in a state before becoming radicals, and $E_p$ is energy of the proton radicals.)

The energies $E_r$, $E_0$, and $E_p$ are each obtained by a density-functional approach. For calculation of a density functional, used is initio molecular orbital method calculation program Gaussian09, Revision E.01 produced by Gaussian, Inc. As the density functional, used is B3LYP density functional (A. D. Becke, J. Chem. Phys. 98 (1993) 5648; C. Lee, W. Yang, R. G. Parr, Phys. Rev. B 37 (1988) 785) proposed by Becke, Lee, Yang, and Parr. As a basis function, used is 6-31G* basis function. (R. Ditchfield, W. J. Hehre, and J. A. Pople, J. Chem. Phys., 54 (1971) 724). As the energy of the radicals in an open-shell state, a value obtained by a restricted open-shell method is used. Stabilization energy is obtained by converting a unit Ha of each energy into kcal/mol.

Examples of the hindered phenol compound include pentaerythritol tetrakis[3-(3',5'-di-tert-butyl-4-hydroxyphenyl)propionate], stearyl 3-(3,5-di-tert-butyl-4-hydroxyphenyl)propionate, 2,4,6-tris(3',5'-di-tert-butyl-4'-hydroxybenzyl)mesitylene, 1,3,5-tris[[3,5-bis(1,1-dimethylethyl)-4-hydroxyphenyl]methyl]-1,3,5-triazine-2,4,6(1H,3H,5H)-trione, and 2,2'-thiodiethylbis[3-(3,5-di-tert-butyl-4-hydroxyphenyl)propionate]. One of the hindered phenol compounds may be used alone, or two or more of the hindered phenol compounds may be used in combination.

A content ratio of the hindered phenol compound contained in elastic member 12 ranges preferably from 0.5 parts by mass to 6.0 parts by mass, inclusive, further preferably from 0.5 parts by mass to 4.0 parts by mass, inclusive, with respect to 100 parts by mass of the elastic polymer contained in elastic member 12. The hindered phenol compound in a content ratio within the above range easily exerts the radical trapping effect, and thus the effect, of suppressing the thermal degradation of elastic member 12 can be further improved. Meanwhile, the hindered phenol compound in a content ratio within the above range allows moderate hardness of the elastic member to be secured, and thus it is possible to suppress swelling of elastic member 12 during a reflow process and to suppress inhibition of vulcanization when elastic member 12 is formed.

Elastic member 12 may further contain a filler. Examples of the filler include talc, mica, silica, kaolin, titania, and/or alumina. A content ratio of the filler contained in elastic member 12 is, for example, preferably more than or equal to 10 parts by mass, further preferably more than or equal to 50 parts by mass, with respect to 100 parts by mass of the elastic polymer contained in elastic member 12. By this configuration, the generation of cracks in elastic member 12 can be suppressed even when elastic member 12 is exposed to a high temperature environment. The content ratio of the filler contained in elastic member 12 is, for example, preferably less than or equal to 120 parts by mass, further preferably less than or equal to 100 parts by mass, with respect to 100 parts by mass of the elastic polymer contained in elastic member 12. By this configuration, moderate hardness of elastic member 12 is easily secured, and a decrease in airtightness of the electrolytic capacitor is suppressed by securing a high sealing function. Further, a decrease in yield during assembling can be suppressed. It is noted that any combination of these lower limit values and upper limit values is possible.

Use of talc as the filler accelerates cross-linking of the elastic polymer to enable further effective suppression of the thermal degradation of the elastic polymer. A content ratio of the talc contained in elastic member 12 is, for example, more than or equal to 10 parts by mass, further preferably more than or equal to 50 parts by mass or more than 50 parts by mass, particularly preferably more than or equal to 70 parts by mass or more than or equal to 80 parts by mass, with respect to 100 parts by mass of the elastic polymer contained in elastic member 12. The talc in a content ratio within the above range easily increases an effect of accelerating the cross-linking of the elastic polymer and is more effective to suppress the thermal degradation of the elastic polymer. The content ratio of the talc contained in elastic member 12 is, for example, less than or equal to 120 parts by mass or less than or equal to 100 parts by mass with respect to 100 parts by mass of the elastic polymer. It is noted that any combination of these lower limit values and upper limit values is possible.

Elastic member 12 may further contain an additive agent (for example, a reinforcing agent (such as carbon black), a cross-linking agent, a cross-linking promoter, a dispersion aid, a modifier, a vulcanizing agent, a vulcanization aid, and/or a processing aid) as necessary.

Elastic member 12 has a shape (for example, a disc shape such as a circular plate shape) corresponding to a shape of the opening of case 11. The opening of case 11 is sealed such that the opening end of the case is curled and is directly or indirectly pressed against elastic member 12.

Elastic member 12 is disposed to close the opening of case 11 but normally has through-holes 12a through which leads penetrate. The leads includes respective lead wires 14A, 14B and respective lead tabs 15A, 15B for taking out a current from capacitor element 10. A periphery of each of through-holes 12a in elastic member 12 is pressed by each of the leads and thus receive stress because there must be no gap between elastic member 12 and the each of the leads at the each of through-holes 12a. Hence, in general, an elastic member having such through-holes tends to be cracked under a high temperature environment. In the present exemplary embodiment, since the thermal degradation of the elastic polymer is suppressed by making elastic member 12 contain the hindered phenol compound described above, the generation of cracks can be suppressed even when elastic member 12 has through-holes 12a.

The sealing member may be constituted only by elastic member 12 and may include another member in addition to elastic member 12. For example, the elastic member may have a resin layer formed on an outer surface of the elastic member. In this case, the sealing member includes the elastic member and the resin layer.

(Case 11)

Examples of a material for case 11 housing capacitor element 10 include metals such as aluminum, stainless steel, copper, iron, and brass, and alloys of these metals. After capacitor element 10 is housed in case 11, the opening of case 11 is sealed with the sealing member. Case 11 has a tubular shape such as a cylindrical shape and may have a bottom part as illustrated in the drawing. When a bottomed case is used, only one opening has to be sealed with the sealing member. Alternatively, when both end parts of a tubular case (in other words, both end parts in a length direction (or in an axis direction) of a tubular shape) are open, the both openings may be sealed with the sealing members.

After capacitor element 10 is housed in case 11 and elastic member 12 of the sealing member is fit in the opening of case 11, the opening of case 11 is reduced in diameter with respect to elastic member 12 and is pressed against the side wall of elastic member 12. Due to this diameter reduction, the sealing member is fixed, and the airtightness between elastic member 12 and the side wall of case 11 can be improved. The diameter reduction is performed in such a manner that drawing (specifically, lateral drawing) is performed, from outside, on case 11 having a tubular shape onto the side wall of elastic member 12. The diameter reduction applies stress to elastic member 12, and when elastic member 12 is exposed to high temperatures under the application of stress, elastic member 12 is thermally degraded significantly. In the present exemplary embodiment, even when stress is easily applied to elastic member 12 due to the diameter reduction as described above, the thermal degradation of the elastic polymer is suppressed since elastic member 12 contains the hindered phenol compound described above, so that the generation of cracks can be suppressed.

When case 11 is reduced in diameter with respect to elastic member 12 at a part in which elastic member 12 is fit, an outer diameter of case 11 at diameter-reduced part 11a becomes smaller than that at other parts of the case. In this part corresponding to the side wall of elastic member 12, a part where the outer diameter of case 11 is smaller than the outer diameters of the other parts is defined as a diameter-reduced part.

(Capacitor Element 10)

Capacitor element 10 (electricity storage element) includes an anode part having a dielectric layer (oxide film), a cathode part, a separator disposed between the anode part and the cathode part, and an electrolyte in contact with the dielectric layer.

(Anode Part)

Examples of the anode part include a metal foil whose surface is roughened and a metal sintered body. A type of the metal that constitutes the anode part is not particularly limited, but it is preferred to use a valve metal such as aluminum, tantalum, niobium, or titanium, or an alloy including a valve metal, in consideration of facilitating formation of the dielectric layer.

Roughening the surface of the metal foil can be performed by a publicly known method. By the roughening, a plurality of projections and recesses are formed on the surface of the metal foil. The roughening is preferably performed by, for example, subjecting the metal foil to an etching treatment. The etching treatment may be performed by, for example, a direct current (DC) electrolytic method or an alternating current (AC) electrolytic method.

(Dielectric Layer)

The dielectric layer is formed on a surface of the anode part. Specifically, the dielectric layer is formed on a roughened surface of the metal foil, so that the dielectric layer is formed along an inner wall surface of pores and pits on the surface of the anode part.

A method for forming the dielectric layer is not particularly limited, and the dielectric layer can be formed by subjecting the anode part to an anodizing treatment. The anodizing treatment may be performed by, for example, immersing the metal foil in an anodizing solution such as an ammonium adipate solution. In the anodizing treatment, a voltage may be applied as necessary in a state in which the metal foil is immersed in the anodizing solution.

Normally, a large metal foil formed of, for example, a valve metal is subjected to the roughening treatment and the anodizing treatment from a viewpoint of mass productivity. In this case, the treated foil is cut in a desired size to prepare the anode part on which the dielectric layer has been formed.

(Cathode Part)

As the cathode part, for example, a metal foil is used. A type of the metal is not particularly limited, but it is preferred to use a valve metal such as aluminum, tantalum, or niobium, or an alloy including a valve metal. Roughening and/or an anodizing treatment may be performed for the cathode part as necessary. The roughening and the anodizing treatment can be performed by, for example, the method described concerning the anode part.

(Separator)

The separator is not particularly limited. For example, a nonwoven fabric may be used that contains a fiber material such as cellulose, polyethylene terephthalate, vinylon, or polyamide (for example, aliphatic polyamide or aromatic polyamide such as aramid).

The capacitor element can be produced by a publicly known method. For example, the capacitor element may be produced by laminating the anode part on which the dielectric layer has been formed and the cathode part, with the separator interposed between the anode part and the cathode part, and then forming a conductive polymer layer between the anode part and the cathode part. The capacitor element may also be produced by winding the anode part on which the dielectric layer has been formed and the cathode part with the separator interposed between the anode part and the cathode part, to form the wound body illustrated in FIG. 2, and forming a conductive polymer layer between the anode part and the cathode part. When the wound body is formed, the winding may be performed while lead tabs 15A, 15B are rolled in the anode part, the cathode part, and the separator, to cause lead wires 14A, 14B to stand up from the wound body as illustrated in FIG. 2.

With a fastening tape is fixed an end of an outer surface of the anode part, the cathode part, or the separator that is positioned at an outermost layer of the wound body (cathode part 22 in FIG. 2). When the anode part is prepared by cutting a large metal foil, the capacitor element in a state of, for example, the wound body may further be subjected to an anodizing treatment in order to provide the dielectric layer on a cutting surface of the anode part.

As the electrolyte, an electrolytic solution or a solid electrolyte can be used, or both of the solid electrolyte and the electrolytic solution may be used.

The solid electrolyte contains, for example, a manganese compound and a conductive polymer. As the conductive polymer, there can be used, for example, polypyrrole, polythiophene, polyaniline, or derivatives of these polymers. The solid electrolyte containing the conductive polymer can be formed by, for example, chemical polymerization and/or electrolytic polymerization of a raw material monomer on the dielectric layer. Alternatively, the solid electrolyte can be formed by applying, to the dielectric layer, a solution in which the conductive polymer is dissolved or a dispersion liquid in which the conductive polymer is dispersed.

The electrolytic solution may be a non-aqueous solvent or a mixture of a non-aqueous solvent and an ionic material (a solute, for example, an organic salt) dissolved in the non-aqueous solvent. The non-aqueous solvent may be an organic solvent or an ionic liquid. As the non-aqueous solvent, there can be used, for example, ethylene glycol, propylene glycol, sulfolane, γ-butyrolactone, or N-methylacetamide. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

The power storage device is not limited to the electrolytic capacitor according to the present exemplary embodiment, but only has to include the sealing member for sealing the case. Examples of the power storage device including the sealing member include devices in various forms, such as batteries including secondary batteries such as a lithium-ion battery, a lithium-ion polymer battery, and a nickel-hydride battery, and a lithium-ion capacitor and an electric double layer capacitor.

EXAMPLES

Hereinafter, the present invention is specifically described with reference to examples and comparative examples. The present invention, however, is not to be limited to the examples below.

<<Samples A1 to A4>>

As the present samples, wound electrolytic capacitors (diameter of 10 mm×length of 10 mm) with a rated voltage of 35 V and a rated capacitance of 270 were produced. Hereinafter, a specific method for manufacturing the electrolytic capacitors is described.

(Production of Capacitor Element)

A dielectric layer was formed by performing an anodizing treatment on an aluminum foil having a roughened surface by using an ammonium adipate solution. The obtained anode part was cut in a predetermined size. A wound body was produced in a following manner: a lead tab was connected to each of aluminum foils as an anode part and a cathode part; the anode part and the cathode part were wound with a separator interposed between the anode part and the cathode part; and an outer surface was fixed with a fastening tape. In this process, the winding was performed while the lead tabs were rolled in the anode part, the cathode part, and the separator such that the lead tabs and lead wires integrated into the lead tabs were led out from the wound body. The anodizing treatment was performed again on the wound body by using the ammonium adipate solution.

The wound body was immersed for 5 minutes in a conductive polymer dispersion that was contained in a predetermined container and that contained polyethylene dioxythiophene, polystyrene sulfonic acid, and water. Thereafter, the wound body was taken out from the conductive polymer dispersion. Next, the wound body impregnated with the polymer dispersion was dried for 20 minutes in a 150° C. drying furnace, so that the conductive polymer was attached between the anode part and the cathode part of the wound body. The capacitor element was completed in this manner and housed in a bottomed cylindrical case having a diameter of 10 mm and a length of 10 mm.

(Impregnation with Electrolytic Solution)

An electrolytic solution was poured into the case and impregnated into the capacitor element in a reduced-pressure atmosphere (40 kPa) for 5 minutes. The electrolytic solution was prepared by dissolving phthalic acid and triethylamine in a solvent containing γ-butyrolactone and ethylene glycol.

(Sealing of Capacitor Element in Case)

Lead tabs 15A, 15B drawn out from capacitor element 10 were made to penetrate through through-holes 12a of the sealing member constituted by elastic member 12 illustrated in FIG. 1, and lead wires 14A, 14B respectively integrated into lead tabs 15A, 15B were led outside elastic member 12. In this state, elastic member 12 was fit in the opening of case 11 and fixed by lateral drawing. By curling the opening end part of case 11, capacitor element 10 was sealed in the case with the sealing member constituted by elastic member 12.

Elastic member 12 was prepared by kneading butyl polymer, the hindered phenol compound, a filler (sintered kaolin and talc), a cross-linking agent, and an additive agent and by vulcanization molding of the kneaded mixture in a circular plate shape having through-holes 12a with use of a molding die. As the additive agent, a reinforcing agent (carbon black), a cross-linking promoter, a dispersion aid (stearin acid), and a modifier (silane coupling agent) were used. A content ratio of each of the components in elastic member 12 was 1.5 parts by mass of the hindered phenol compound, 20 parts by mass of sintered kaolin, and 80 parts by mass of talc, with respect to 100 parts by mass of butyl rubber as the elastic polymer.

The hindered phenol compounds used in the samples A1 to A4 are respectively following (a1) to (a4). The reaction heat of phenol radical formation $H_r$ calculated by the procedure described above and the molecular weight were also described.

(a1) Pentaerythritol tetrakis[3-(3',5'-di-tert-butyl-4'-hydroxyphenyl)propionate], $H_r$=76.8 kcal/mol (≈321.3 kJ/mol), molecular weight 1178

(a2) Stearyl 3-(3,5-di-tert-butyl-4-hydroxyphenyl)propionate, $H_r$=78.5 kcal/mol (≈328.4 kJ/mol), molecular weight 531

(a3) 2,4,6-Tris(3',5'-di-tert-butyl-4'-hydroxybenzyl)mesitylene, $H_r$=78.1 kcal/mol 326.8 kJ/mol), molecular weight 775

(a4) 1,3,5-tris[[3,5-bis(1,1-dimethylethyl)-4-hydroxyphenyl]methyl]-1,3,5-triazine-2,4,6(1H,3H,5H)-trione, $H_r$=80.0 kcal/enol (≈334.7 kJ/mol), molecular weight 784

Chemical formulae of (a1) to (a4) are as follows.

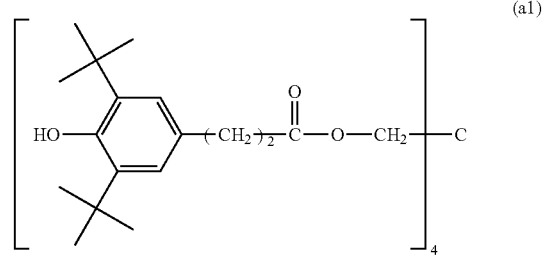

(a2)

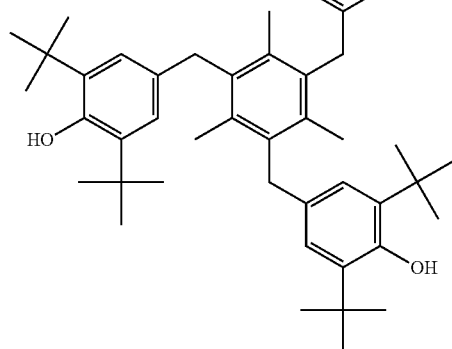

(a3)

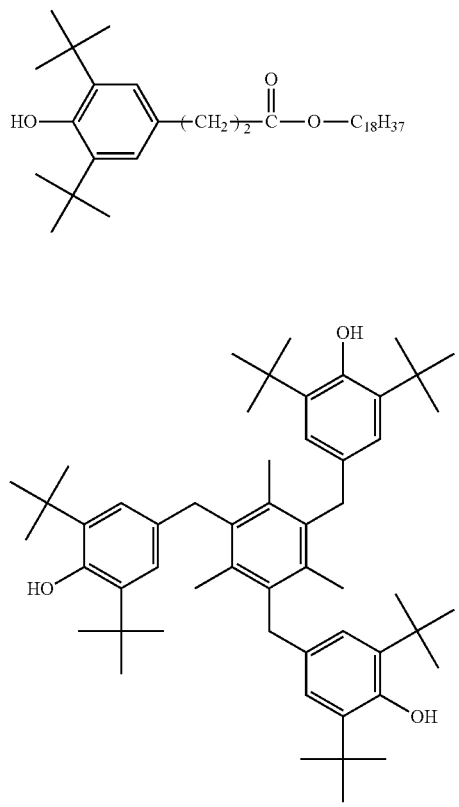

(a4)

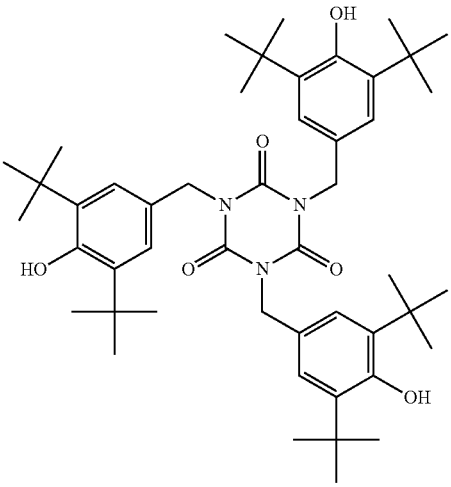

<<Samples B1 to B5>>

An elastic member was formed in the same manner as the sample A1 except that a less hindered phenol compound was used in place of the hindered phenol compound, and electrolytic capacitors were produced using this elastic member.

The less hindered phenol compounds used in samples B1 to B5 are respectively following (b1) to (b5). These less hindered phenol compounds have, as illustrated in chemical formulae of (b1) to (b5), a hydrogen atom, a primary carbon atom, or a secondary carbon atom bonded to at least one substitution site adjacent to a phenolic hydroxy group in a phenol skeleton.

(b1)

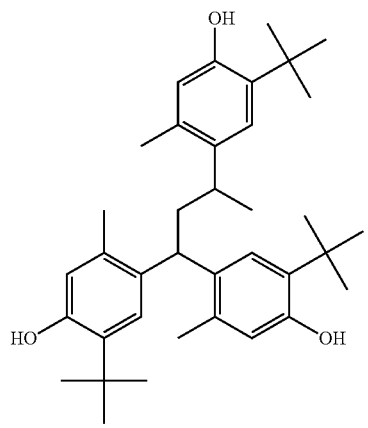

(b5)

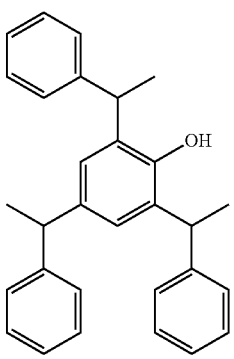

(b2)

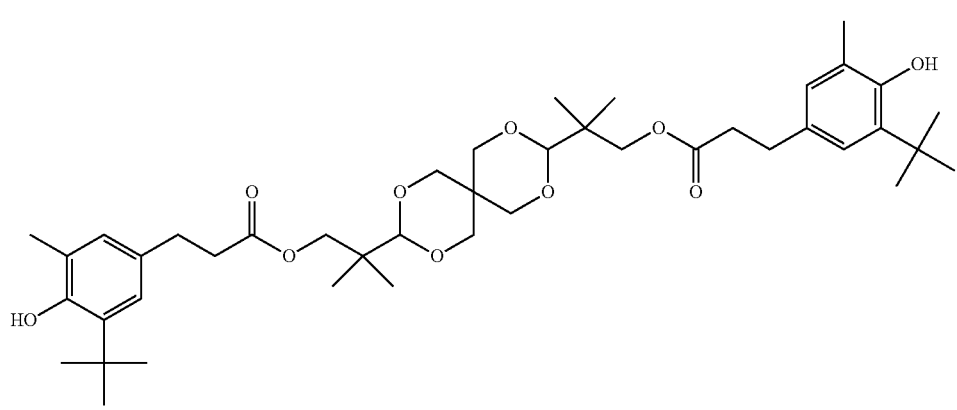

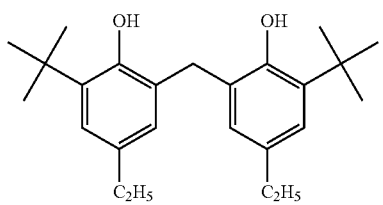

(b3)

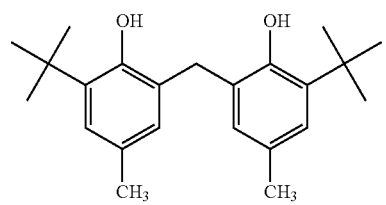

(b4)

The reaction heat of phenol radical formation $H_r$ calculated by the procedure described above and the molecular weight of (b1) to (b5) are as follows.

(b1) $H_r$=83.0 kcal/mol (≈347.3 kJ/mol), molecular weight 545

(b2) $H_r$=81.2 kcal/mol (≈339.7 kJ/mol), molecular weight 741

(b3) $H_r$=83.2 kcal/mol (≈348.1 kJ/mol), molecular weight 369

(b4) $H_r$=83.4 kcal/mol (≈348.9 kJ/mol), molecular weight 341

(b5) $H_r$=83.3 kcal/mol (≈348.5 kJ/mol), molecular weight 407

<< Evaluations>>

The thermal degradation of the elastic members was evaluated by a following procedure.

(Evaluation 1)

Change rates of mass of the elastic members respectively produced for the samples A and B were evaluated. The change rate of mass was obtained according to a following equation, with m0 defined as an initial mass of the elastic member and m1 as a mass obtained after the elastic member was left to stand still in a 165° C. environment for 500 hours.

Change rate of mass (%)=((m0−m1)/m0)×100

(Evaluation 2)

After the electrolytic capacitor samples A and B were left to stand still in a 165° C. environment for 500 hours, crack lengths of the elastic members were measured. The crack length was obtained by measuring a straight-line distance between both end parts of a longest crack observed on a transmission image captured from a side surface of the electrolytic capacitor. A crack generation state was evaluated under following criteria based on a size of the crack length.

VG: crack length of less than or equal to 0.2 mm

OK: crack length of greater than 0.2 mm and less than or equal to 0.7 mm

NG: crack length of greater than 0.7 mm.

Table 1 shows results.

TABLE 1

|    | Change rate of mass (%) | Evaluation for generation of cracks |
|----|-------------------------|-------------------------------------|
| A1 | 3.5                     | VG                                  |
| A2 | 4.0                     | VG                                  |
| A3 | 4.3                     | VG                                  |
| A4 | 3.9                     | VG                                  |
| B1 | 8.2                     | NG                                  |
| B2 | 7.9                     | NG                                  |
| B3 | 8.0                     | NG                                  |
| B4 | 7.9                     | NG                                  |
| B5 | 8.2                     | NG                                  |

<<Samples A5 to A8>>

The content ratio of sintered kaolin and talc with respect to 100 parts by mass of butyl rubber were changed as follows. Elastic members and electrolytic capacitors were produced in the same manner as the sample A1 other than the above change, and were evaluated.

Sintered kaolin/talc=90 parts by mass/10 parts by mass (A5), 70 parts by mass/30 parts by mass (A6), 50 parts by mass/50 parts by mass (A7), 0 parts by mass/120 parts by mass (A8)

Table 2 shows results of the samples A5 to A8. Table 2 also shows the result of the sample A1.

TABLE 2

|    | Change rate of mass (%) | Evaluation for generation of cracks |
|----|-------------------------|-------------------------------------|
| A5 | 5.7                     | OK                                  |
| A6 | 4.9                     | VG                                  |
| A7 | 4.3                     | VG                                  |
| A1 | 3.5                     | VG                                  |
| A8 | 2.9                     | VG                                  |

<<Samples A9 to A13>>

Elastic members and electrolytic capacitors were produced in the same manner as the samples A1 and A5 to A8 except that the content ratio of the hindered phenol compound with respect to 100 parts by mass of butyl rubber was changed to 0.5 parts by mass, and the elastic members and the electrolytic capacitors were evaluated. The amounts of sintered kaolin and talc are as follows.

Sintered kaolin/talc=90 parts by mass/10 parts by mass (A9), 70 parts by mass/30 parts by mass (A10), 50 parts by mass/50 parts by mass (A11), 20 parts by mass/80 parts by mass (A12), 0 parts by mass/120 parts by mass (A13)

Table 3 shows results of the samples A9 to A13.

TABLE 3

|     | Change rate of mass (%) | Evaluation for generation of cracks |
|-----|-------------------------|-------------------------------------|
| A9  | 6.2                     | OK                                  |
| A10 | 5.3                     | OK                                  |
| A11 | 4.5                     | VG                                  |
| A12 | 3.6                     | VG                                  |
| A13 | 3.0                     | VG                                  |

<<Samples A14 to A18>>

Elastic members and electrolytic capacitors were produced in the same manner as the samples A1 and A5 to A8 except that the content ratio of the hindered phenol compound with respect to 100 parts by mass of butyl rubber was changed to 4.0 parts by mass, and the elastic members and the electrolytic capacitors were evaluated. The amounts of sintered kaolin and talc are as follows.

Sintered kaolin/talc=90 parts by mass/10 parts by mass (A14), 70 parts by mass/30 parts by mass (A15), 50 parts by mass/50 parts by mass (MG), 20 parts by mass/80 parts by mass (A17), 0 parts by mass/1.20 parts by mass (A18)

Table 4 shows results of the samples A14 to A18.

TABLE 4

|     | Change rate of mass (%) | Evaluation for generation of cracks |
| --- | --- | --- |
| A14 | 5.6 | OK |
| A15 | 4.7 | VG |
| A16 | 4.1 | VG |
| A17 | 3.4 | VG |
| A18 | 2.7 | VG |

<<Samples A19 to A23>>

Elastic members and electrolytic capacitors were produced in the same manner as the samples A1 and A5 to A8 except that the content ratio of the hindered phenol compound with respect to 100 parts by mass of butyl rubber was changed to 6.0 parts by mass, and the elastic members and the electrolytic capacitors were evaluated. The amounts of sintered kaolin and talc are as follows.

Sintered kaolin/talc=90 parts by mass/10 parts by mass (A19), 70 parts by mass/30 parts by mass (A20), 50 parts by mass/50 parts by mass (A21), 20 parts by mass/80 parts by mass (A22), 0 parts by mass/120 parts by mass (A23)

Table 5 shows results of the samples A19 to A23.

TABLE 5

|     | Change rate of mass (%) | Evaluation for generation of cracks |
| --- | --- | --- |
| A19 | 5.2 | OK |
| A20 | 4.6 | VG |
| A21 | 4.0 | VG |
| A22 | 3.3 | VG |
| A23 | 2.5 | VG |

As shown in Tables 2 to 5, even the samples A to which talc was added each give a low change rate of mass and have a shorter crack length, reducing the generation of cracks.

The electrolytic capacitor according to the present invention suppresses the thermal degradation of the elastic member that constitutes the sealing member sealing the opening of the case. Hence, the electrolytic capacitor is appropriate for use at high temperatures (for example, temperatures higher than 100° C. or 150° C.), such as use in an automobile engine room.

What is claimed is:

1. A power storage device comprising:
an electricity storage element;
a case housing the electricity storage element, the case having an opening; and
a sealing member sealing the opening, wherein:
the sealing member includes an elastic member fit in the opening,
the elastic member contains an elastic polymer, a hindered phenol compound, and a filler,
the hindered phenol compound having a phenol skeleton includes a first hindered group and a second hindered group, the first hindered group being bonded to a first substitution site of the phenol skeleton, the second hindered group being bonded to a second substitution site of the phenol skeleton, each of the first substitution site and second substitution site being adjacent to a substitution site of the phenol skeleton to which a phenolic hydroxy group is bonded,
the first hindered group and the second hindered group each include one or more tertiary carbon atoms,
one of the one or more tertiary carbon atoms in the first hindered group is bonded to the first substitution site,
one of the one or more tertiary carbon atoms in the second hindered group is bonded to the second substitution site,
a reaction heat of phenol radical formation for the hindered phenol compound ranges from 76.8 kcal/mol to 82 kcal/mol, inclusive,
a content ratio of the hindered phenol compound included in the elastic member ranges from 1.5 parts by mass to 6 parts by mass, inclusive, with respect to 100 parts by mass of the elastic polymer included in the elastic member,
the filler includes kaolin and talc,
a content ratio of the talc included in the elastic member ranges from 50 parts by mass to 120 parts by mass, inclusive, with respect to 100 parts by mass of the elastic polymer included in the elastic member, and
a proportion of the kaolin in total of the kaolin and the talc included in the elastic member is less than or equal to 70 mass %.

2. The power storage device according to claim 1, wherein:
the elastic member includes a through-hole, and
the power storage device includes a lead penetrating through the through-hole.

3. The power storage device according to claim 1, wherein the case has a diameter-reduced region onto a side wall of the elastic member.

4. The power storage device according to claim 1, wherein the hindered phenol compound has a molecular weight ranging from 300 to 3000, inclusive.

5. The power storage device according to claim 1, wherein each of the first hindered group and the second hindered group is t-butyl group.

6. The power storage device according to claim 1, wherein the content ratio of the talc included in the elastic member is more than 50 parts by mass and less than or equal to 120 parts by mass, with respect to 100 parts by mass of the elastic polymer included in the elastic member.

7. The power storage device according to claim 1, wherein the electricity storage element is a capacitor element including an anode part and a cathode part, a dielectric layer being disposed on a surface of the anode part.

8. The power storage device according to claim 1, wherein the content ratio of the talc included in the elastic member ranges from 50 parts by mass to 80 parts by mass, inclusive, with respect to 100 parts by mass of the elastic polymer included in the elastic member.

9. The power storage device according to claim 1, wherein the content ratio of the hindered phenol compound included in the elastic member ranges from 4 parts by mass to 6 parts by mass, inclusive, with respect to 100 parts by mass of the elastic polymer included in the elastic member.

10. The power storage device according to claim 1, wherein the hindered phenol compound includes at least one of the group consisting of tetrakis[3-(3',5'-di-tert-butyl-4'-hydroxyphenyl)propionate], stearyl 3-(3,5-di-tert-butyl-4-hydroxyphenyl)propionate, 2,4,6-tris(3',5'-di-tert-butyl-4'-hydroxybenzyl)mesitylene, and 1,3,5-tris[[3,5-bis(1,1-dimethylethyl)-4-hydroxyphenyl]methyl]-1,3,5-triazine-2,4,6(1H,3H,5H)-trione.

11. A power storage device comprising:
an electricity storage element;
a case housing the electricity storage element, the case having an opening; and
a sealing member sealing the opening, wherein:
the sealing member includes an elastic member fit in the opening,
the elastic member contains an elastic polymer, a hindered phenol compound, a filler, and a reinforcing agent,
the hindered phenol compound having a phenol skeleton includes a first hindered group and a second hindered group, the first hindered group being bonded to a first substitution site of the phenol skeleton, the second hindered group being bonded to a second substitution site of the phenol skeleton, each of the first substitution site and second substitution site being adjacent to a substitution site of the phenol skeleton to which a phenolic hydroxy group is bonded,
the first hindered group and the second hindered group each include one or more tertiary carbon atoms,
one of the one or more tertiary carbon atoms in the first hindered group is bonded to the first substitution site,
one of the one or more tertiary carbon atoms in the second hindered group is bonded to the second substitution site,
a reaction heat of phenol radical formation for the hindered phenol compound ranges from 76.8 kcal/mol to 82 kcal/mol, inclusive,
a content ratio of the hindered phenol compound included in the elastic member ranges from 1.5 parts by mass to 6 parts by mass, inclusive, with respect to 100 parts by mass of the elastic polymer included in the elastic member,
the filler includes talc,
the reinforcing agent includes carbon black, and
a content ratio of the talc included in the elastic member ranges from 50 parts by mass to 120 parts by mass, inclusive, with respect to 100 parts by mass of the elastic polymer included in the elastic member.

12. The power storage device according to claim 11, wherein the content ratio of the talc included in the elastic member is more than 50 parts by mass and less than or equal to 120 parts by mass, with respect to 100 parts by mass of the elastic polymer included in the elastic member.

13. The power storage device according to claim 11, wherein the content ratio of the talc included in the elastic member ranges from 50 parts by mass to 80 parts by mass, inclusive, with respect to 100 parts by mass of the elastic polymer included in the elastic member.

14. The power storage device according to claim 11, wherein the content ratio of the hindered phenol compound included in the elastic member ranges from 4 parts by mass to 6 parts by mass, inclusive, with respect to 100 parts by mass of the elastic polymer included in the elastic member.

15. The power storage device according to claim 11, wherein the hindered phenol compound includes at least one of the group consisting of tetrakis[3-(3',5'-di-tert-butyl-4'-hydroxyphenyl)propionate], stearyl 3-(3,5-di-tert-butyl-4-hydroxyphenyl)propionate, 2,4,6-tris(3',5'-di-tert-butyl-4'-hydroxybenzyl)mesitylene, and 1,3,5-tris[[3,5-bis(1,1-dimethylethyl)-4-hydroxyphenyl]methyl]-1,3,5-triazine-2,4,6(1H,3H,5H)-trione.

* * * * *